3,167,556
BASIC DERIVATIVES OF ANILIDES
John Krapcho, Somerset, N.J., assignor to Olin Mathieson Chemical Corporation, New York, N.Y., a corporation of Virginia
No Drawing. Filed Nov. 19, 1963, Ser. No. 324,864
10 Claims. (Cl. 260—268)

This application is a continuation-in-part of application Serial No. 194,962, filed May 15, 1962, and also a continuation-in-part of application Serial No. 230,254, filed October 12, 1962, and now abandoned.

This invention relates to bases of the formula

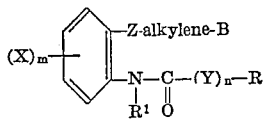

and to acid addition salts and quaternary ammonium salts thereof.

The symbols in Formula I have the following meanings:

B represents a basic nitrogen containing radical of less than 12 carbon atoms.
R represents hydrogen, lower alkyl, $(X)_m$-phenyl, furyl, thienyl, pyridyl and piperonyl.
$R^1$ represents hydrogen, lower alkyl and phenyl-lower alkyl.
X represents hydrogen, halo, lower alkyl, lower alkoxy, hydroxy, hydroxy-lower alkyl, lower alkanoyl, trihalomethyl, nitro, amino and dialkylamino.
Y represents lower alkenylene and lower alkynylene.
Z represents carbonyl (C=O) or sulfonyl

m represents 1, 2 and 3.
n represents 1 or 2.

The lower alkyl groups represented by R, $R^1$ and X include straight and branched chain saturated aliphatic groups such as methyl, ethyl, propyl, isopropyl, butyl, isobutyl, t-butyl, amyl, isoamyl, hexyl and the like. Methyl and ethyl are preferred. The lower alkoxy groups contain alkyl groups of the same character attached to the oxygen atom. The term "alkylene" includes such straight and branched chain aliphatic groups having up to about 14 carbon atoms, but lower alkylene groups are preferred.

$R^1$ represents phenyl-lower alkyl groups such as benzyl, phenethyl and the like, the first being preferred.

The unsaturated groups represented by Y are divalent straight or branched chain groups containing one carbon to carbon double bond (lower alkenylene), or one carbon to carbon triple bond (lower alkynylene) illustrated by the following:

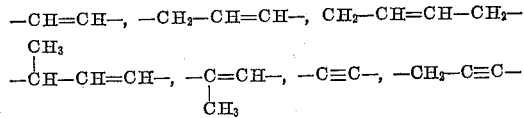

and the like.

Each of the four halogens is contemplated by the terms "halo" and "trihalomethyl," but in the case of the halogens themselves chlorine and bromine are preferred while trifluoromethyl is the preferred trihalomethyl group.

The lower alkanoyl groups represented by X are the acyl moieties derived from lower fatty acids containing alkyl groups of the character described above and include, for example, acetyl, propionyl, butyryl and the like.

R represents a phenyl group or a phenyl group which contains one to three substituents represented by the symbol X. Illustrative of the substituted phenyl groups are the following: o-, m- and p-chlorophenyl, o-, m- and p-bromophenyl, o-, m- and p-nitrophenyl, 3,4-dinitrophenyl, 2,4-dichlorophenyl, 2,3-dichlorophenyl, 2,3-dibromophenyl, 3,4-dichlorophenyl, o-, m- and p-tolyl, o-, m- and p-xylyl, mesityl, p-methoxyphenyl, p-ethoxyphenyl, p-acetylphenyl, o-, m- and p-trifluoromethylphenyl, o-, m- and p-trichloromethylphenyl, 3,4-di(trifluoromethyl)-phenyl, p-hydroxyphenyl, m-aminophenyl, o-dimethylamino, and the like.

The basic nitrogen containing radicals symbolized by B may be represented by the formula (II) 

or (III) 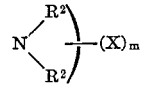

wherein $R^2$ represents hydrogen, lower alkyl, hydroxy-lower alkyl, phenyl-lower alkyl and N-(lower alkyl)-phenyl-(lower alkyl) forming such basic groups as amino, lower alkylamino, e.g., methylamino, ethylamino, di-(lower alkyl)amino, e.g., dimethylamino, diethylamino, dipropylamino, (hydroxy-lower alkyl)amino, e.g., hydroxyethylamino, di(hydroxy-lower alkyl)amino, e.g., di-(hydroxyethyl)amino, phenyl(lower alkyl)amino, e.g., benzylamino, phenethylamino, N-(lower alkyl)-phenyl-(lower alkyl)amino, e.g., N-methylbenzylamino and the like.

In addition the nitrogen may join with the groups represented by $R^2$ as in Formula III to form a 5 to 7 membered monocyclic heterocyclic containing, if desired, an oxygen, sulfur or an additional nitrogen atom (no more than two hetero atoms altogether) that is, the two symbols $R^2$ represent together tetramethylene, pentamethylene, hexamethylene, oxytetramethylene, oxypentamethylene, azatetramethylene, azapentamethylene, azahexamethylene, thiatetramethylene or thiapentamethylene. The heterocyclic group may also be substituted by one to three groups represented by X as defined previously.

Thus heterocyclic groups represented by B include, for example, piperidino, (lower alkyl)piperidino, e.g., methylpiperidino, di(lower alkyl)piperidino, e.g., dimethylpiperidino, (lower alkoxy)piperidino, e.g., methoxypiperidino, 2-, 3- or 4-piperidyl, 2-, 3- or 4-(N-lower alkylpiperidino), e.g., 2-, 3- or 4-(N-methylpiperidyl), pyrrolidino, (lower alkyl)pyrrolidino, e.g., methylpyrrolidino, di(lower alkyl)pyrrolidino, e.g., dimethylpyrrolidino, (lower alkoxy)-pyrrolidino, e.g., ethoxypyrrolidino, 2- or 3-pyrrolidyl, 2- or 3-(N-lower alkylpyrrolidyl), e.g., 2- or 3-(N-methylpyrrolidyl), morpholino, (lower alkyl)morpholino, e.g., 3-methylmorpholino or 2-methylmorpholino, di(lower alkyl)morpholino, e.g., 2,3-dimethylmorpholino, (lower alkoxy)morpholino, e.g., ethoxymorpholino, thiamorpholino, (lower alkyl)thiamorpholino, e.g., 3-methylthiamorpholino or 2-methylthiamorpholino, di(lower alkyl)-thiamorpholino, e.g., 2,3-dimethylthiamorpholino, (lower alkoxy)thiamorpholino, e.g., 2-methoxythiamorpholino, piperazino (lower alkyl)piperazino, e.g., $N^4$-methylpiperazino, 2-methylpiperazino or 3-methylpiperazino, di-(lower alkyl)piperazino, e.g., 2,3-dimethylpiperazino, hexamethyleneimino and homopiperazino.

The preferred members of the class defined by Formula I are those wherein X is hydrogen and Y is lower alkenylene, particularly with 2 or 3 carbon atoms, R is phenyl, B is di-lower alkylamino, especially dimethylamino and diethylamino, piperidino, morpholino and $N^4$-methylpiperazino, m represents 1, n represents 1 and the alkylene group has 2 or 3 carbon atoms, especially 2. The compounds of Formula I when Z is C=O may be produced by reacting with a compound of the formula (IV)
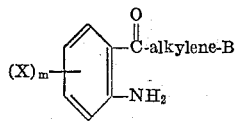

an acyl halide of the formula (V) R—(Y)$_n$—CO-hal

The symbols have the same meaning as previously described and hal represents a halogen, preferably chlorine or bromine. This reaction is preferably effected in an inert organic solvent such as chloroform, benzene, toluene, ether or the like at a temperature from about room temperature to reflux temperature. Usually the product is obtained as the acid salt and the base may be liberated by treatment with a base such as sodium hydroxide.

The sulfonyl compounds of Formula I, i.e., when Z represents sulfonyl, are produced by oxidizing with hydrogen peroxide, e.g., in glacial acetic acid, the corresponding compounds wherein sulfur is in the position occupied by Z in Formula I. The sulfur containing compounds are produced by reacting an unsubstituted or appropriately substituted 2-aminothiophenol with a compound of the formula (VI) B-alkylene-hal wherein B has the previously defined meansing in the presence of a strong base such as sodium methoxide or sodamide. The product of the formula (VII)
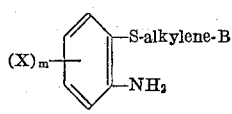

is then reacted with a compound of the Formula V above or alternatively by cleaving the ring of an unsubstituted or appropriately substituted benzothiazepine-4-one with sodamide, then reacting the intermediate thus formed with a compound of Formula VI all as disclosed in parent application Serial No. 194,962, filed May 15, 1962.

Compounds of Formula I wherein R$^1$ is hydrogen are preferably produced by the above described procedure, then the substituent other than hydrogen represented by R$^1$ is introduced by forming an alkali metal salt such as the sodium salt and alkylating, e.g., with an alkyl halide such as methyl chloride, ethyl bromide and the like or a phenyl-alkyl halide such as benzyl bromide, phenethyl chloride and the like.

The bases of Formula I form acid addition salts by reaction with the common inorganic and organic acids. Such inorganic salts as the hydrohalides, e.g., hydrobromide, hydrochlorides, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g., methanesulfonate, arylsulfonate, e.g., benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The bases of Formula I also form quaternary ammonium salts, e.g., lower alkyl halides such as methyl chloride, methyl bromide, ethyl chloride, etc., lower alkyl sulfates such as methyl sulfate, ethyl sulfate, etc., monocyclic aryl (lower alkyl) halides and sulfates such as benzyl sulfate, etc. This is accomplished by reacting the base with the alkyl halide, sulfate, or the like.

The compounds of this invention are therapeutically active substances which possess serotonin inhibitory and hypotensive activities. They are useful in the treatment of conditions such as hypertension. They may be administered orally or parenterally in the form of tablets, capsules, elixirs, injectables or the like by incorporating the appropriate dosage of the base of Formula I or a physiologically acceptable acid addition salt or quaternary ammonium salt thereof in a conventional vehicle according to accepted pharmaceutical practice.

The following examples are illustrative of the invention. All temperatures are expressed on the centigrade scale.

EXAMPLE 1

2'-(3-dimethylaminopropionyl)cinnamanilide, hydrochloride

A solution of 16.7 g. of cinnamoyl chloride in 200 ml. of chloroform is cooled to 20° and treated dropwise with a solution of 19.2 g. of 2'-amino-3-dimethylaminopropiophenone [Sci. 120, 544 (1954)] in 50 ml. of chloroform. The mixture is stirred at room temperature for one hour, filtered and the filtrate diluted to 700 ml. with ether to give a colorless product, M.P. about 148–150°. After crystallization from absolute alcohol, it melts at about 156–158°. The free base is obtained by treating the hydrochloride with sodium hydroxide solution.

EXAMPLE 2

2'-(3-piperidinopropionyl)cinnamanilide, hydrochloride (A) Preparation of 2'-nitro-3-piperidinopropiophenone, hydrochloride.—A mixture of 16.5 g. of o-nitroacetophenone, 12.2 g. of piperidine hydrochloride, 6 g. of paraformaldehyde and 30 ml. of ethanol is refluxed for one hour, cooled and diluted to 300 ml. with acetone to yield 2'-nitro-3-piperidinopropiophenone hydrochloride as a crystalline product.

(B) Preparation of 2'-amino-3-piperidinopropiophenone.—A solution of 25 g. of material from part (A) in 100 ml. of ethanol is treated with 3 g. of palladium on carbon catalyst and the mixture placed under three atmospheres of hydrogen. After three equivalents of hydrogen are consumed, the mixture is filtered and the filtrate concentrated under reduced pressure. The residue is dissolved in 50 ml. of water and treated with a cold solution of 4 g. of sodium hydroxide in 20 ml. of water. The liberated base is extracted with 50 ml. portions of ether and the combined extract dried over magnesium sulfate. The mixture is filtered and the solvent evaporated to give 2'-amino-3-piperidinopropiophenone.

(C) Preparation of 2'-(3-piperidinopropionyl)cinnamanilide, hydrochloride.—The material from part (B) is dissolved in 50 ml. of chloroform and added to a cold solution of an equivalent of cinnamoyl chloride in 100 ml. of chloroform. The reaction is carried out in the same manner as Example 1 to give 2'-(3-piperidinopropionyl)cinnamanilide, hydrochloride.

EXAMPLE 3

2'-[3-(N-methyl-N-phenethylamino)propionyl]cinnamanilide, hydrochloride

By substituting an equivalent quantity of N-methylphenethylamine hydrochloride for the piperidine hydrochloride in Example 2, 2'-[3-(N-methyl-N-phenethylamino)propionyl]cinnamanilide hydrochloride is obtained.

EXAMPLE 4

2'-[3-(4-methylpiperazino)propionyl]cinnamanilide, hydrochloride

By substituting an equivalent quantity of 1-methylpiperazine hydrochloride for the piperidine hydrochloride in Example 2, 2'-[3-(4-methylpiperazino)propionyl]cinnamanilide, hydrochloride, is obtained.

EXAMPLE 5

*2'-(3-dimethylaminopropionyl)-4-methoxycinnamanilide, hydrochloride*

By substituting an equivalent quantity of 5-methoxy-2-nitroacetophenone for o-nitroacetophenone in Example 2, 2'-(3-dimethylaminopropionyl)-4-methoxycinnamanilide, hydrochloride, is obtained.

EXAMPLE 6

*2'-(3-dimethylamino-2-methylpropionyl)cinnamanilide, hydrochloride*

By substituting an equivalent quantity of o-nitropropiophenone for o-nitroacetophenone in Example 2, 2'-(3-dimethylamino-2-methylpropionyl)cinnamanilide, hydrochloride, is obtained.

EXAMPLE 7

*2'-(3-dimethylaminopropionyl)crotonanilide, hydrochloride*

By substituting an equivalent quantity of crotonyl chloride for the cinnamoyl chloride in Example 1, 2'-(3-dimethylaminopropionyl)crotonanilide, hydrochloride, is obtained.

EXAMPLE 8

*2'-(3-dimethylaminopropionyl)phenylpropiolanilide, hydrochloride*

By substituting an equivalent quantity of phenylpropiolyl chloride for cinnamoyl chloride in Example 1, 2'-(3-dimethylaminopropionyl)phenylpropiol anilide, hydrochloride, is obtained.

EXAMPLE 9

*2'-(3-dimethylaminopropionyl)-α-methylcinnamanilide, hydrochloride*

By substituting an equivalent amount of α-methylcinnamoyl chloride for cinnamoyl chloride in Example 1, 2'-(3-dimethylaminopropionyl)-α-methylcinnamanilide, hydrochloride, is obtained.

EXAMPLE 10

*4-chloro-2'-(3-dimethylaminopropionyl)cinnamanilide, hydrochloride*

By substituting an equivalent quantity of p-chlorocinnamoyl chloride for the cinnamoyl chloride in Example 1, 4-chloro-2'-(3-dimethylaminopropionyl)cinnamanilide, hydrochloride, is obtained.

EXAMPLE 11

*2'-(3-dimethylaminopropionyl)-3,4,5-trimethoxycinnamanilide, hydrochloride*

By substituting an equivalent quantity of 3,4,5-trimethoxycinnamoyl chloride for the cinnamoyl chloride in Example 1, 2'-(3-dimethylaminopropionyl)-3,4,5-trimethoxycinnamanilide, hydrochloride, is obtained.

EXAMPLE 12

*2'-(3-dimethylaminopropionyl)-β-(2-thiophene)acrylanilide, hydrochloride*

By substituting an equivalent quantity of the acid chloride of β-(2-thiophene)acrylic acid for cinnamoyl chloride in the procedure of Example 1, 2'-(3-dimethylaminopropionyl)-β-(2-thiophene)acrylanilide, hydrochloride, is obtained.

In a similar manner, the substitution of an equivalent quantity of the acid chlorides of β-(2-furoyl)acrylic, β-(2-pyridyl)acrylic, β-(4-pyridyl)acrylic and β-(3-piperonyl)acrylic acids for the cinnamoyl chloride, yields respectively, 2'-(3-dimethylaminopropionyl) - β-(2-furyl)acrylanilide, hydrochloride, 2'-(3-dimethylaminopropionyl)-β-(2-pyridyl)acrylanilide, hydrochloride, 2' - (3 - dimethylaminopropionyl)-β-(4-pyridyl)acrylanilide, hydrochloride and 2'-(3 - dimethylaminopropionyl) - β - (3 - piperonyl)acrylanilide, hydrochloride.

EXAMPLE 13

*2'-(3-dimethylaminopropionyl)sorbanilide, hydrochloride*

By substituting an equivalent quantity of sorboyl chloride for cinnamoyl chloride in the procedure of Example 1, 2'-(3-dimethylaminopropionyl)sorbanilide, hydrochloride, is obtained.

EXAMPLE 14

*2'-(2-dimethylaminoacetyl)-4',5'-dimethoxycinnamanilide, hydrochloride*

By substituting 2'-amino-4',5'-dimethoxy - 2 - dimethylaminoacetophenone [Arch. Pharm. 277, 117 (1939)] for 2'-amino-3-dimethylaminopropiophenone in Example 1, 2'-(2-dimethylaminoacetyl)-4',5-dimethoxycinnamanilide, hydrochloride, is obtained.

EXAMPLE 15

*2'-(3-dimethylaminopropionyl)cinnamanilide methochloride*

A solution of 5 g. of the free base from Example 1 in 25 ml. of acetonitrile is treated with 10 g. of methyl chloride. The solution is allowed to stand at room temperature for one day and the solution diluted with 200 ml. of ether to give 2'-(3-dimethylaminopropionyl)cinnamanilide, methochloride, as a crystalline product.

EXAMPLE 16

*2'-(3-dimethylaminopropionyl)cinnamanilide ethiodide*

By substituting 15.0 g. of ethyl iodide for the methyl chloride in Example 15, 2'-(3-dimethylaminopropionyl)-cinnamanilide, ethiodide is obtained.

EXAMPLE 17

*2'-(3-dimethylaminopropylsulfonyl)cinnamanilide oxalate*

(A) *Preparation of 2'-(3-dimethylaminopropylthio)-cinnamanilide.*—A suspension of 9.6 g. sodium hydride dispersion (50%) in 500 ml. of toluene is treated with a suspension of 50.8 g. of 3,5-dihydro-2-phenyl-1,5-benzothiazepin-4-one in 500 ml. of toluene. After stirring for five minutes at room temperature the resulting solution is treated with 25.0 g. of 3-dimethylaminopropyl chloride and then stirred and refluxed for three hours. After cooling, the mixture is treated with 150 ml. of water. The layers are separated and the organic phase extracted with 25 ml. of conc. hydrochloric acid in 300 ml. of water. The mixture is shaken and 25 ml. of ethanol is added to clarify the resulting emulsion. The aqueous phase is then washed with 200 ml. of ether, cooled and treated with a solution of 18 g. of sodium hydroxide in 50 ml. of water. The liberated base is extracted three times with 600 ml. portions of ether. After drying the combined ether phase with magnesium sulfate, the solvent is evaporated to give about 66 g. of colorless product, M.P. about 81–83°.

(B) *2'-(3-dimethylaminopropylsulfonyl)cinnamanilide oxalate.*—A solution of 5.0 g. of material from A in 25 ml. of glacial acetic acid is treated with 7 ml. of 28% hydrogen peroxide. The temperature of the mixture rises from 25 to 43°. After standing overnight at room temperature, the solution is diluted with 125 ml. of water, cooled and made alkaline by portionwise addition of potassium carbonate. The product is extracted with 200 ml. portions of ether and the extracts combined and dried over magnesium sulfate. The mixture is filtered and the filtrate treated with a solution of 1.8 g. of oxalic acid in 200 ml. of ether to yield about 6.0 g. of colorless solid, M.P. about 188–191°. Recrystallization from 200 ml. of methanol gives about 4.6 of material; M.P. about 189–191°.

By neutralizing the oxalate with dilute sodium hydroxide, extracting the free base with ether, drying over magnesium sulfate, filtering the ethereal solution of the base and treating it with alcoholic—HCl, the hydrochloride is obtained.

EXAMPLE 18

*4-chloro-2'-(3-dimethylaminopropylsulfonyl)-cinnamanilide, hydrochloride*

(A) *Preparation of 2'-(3-dimethylaminopropylthio)-aniline.*—A suspension of 29 g. of sodamide in 1.0 l. of toluene is treated with a solution of 90 g. of 2-aminothiophenol in 300 ml. toluene. The mixture is then warmed on a steam bath and maintained at 85–90° for thirty minutes, cooled to room temperature and treated with a solution of 93.5 g. of 3-dimethylaminopropyl chloride in 460 ml. of toluene. The material is then refluxed for five hours, cooled, treated with 100 ml. of water and the aqueous layer discarded. The organic phase is added portionwise to a cold solution of 100 ml. of concentrated hydrochloric acid in 300 ml. of water and the mixture shaken. The organic phase is discarded, the aqueous layer cooled and treated with a cold solution of 50 g. of sodium hydroxide in 100 ml. of water. The product is extracted with 500 ml. portions of ether (three times) and dried over magnesium sulfate. After evaporation of the solvent, the residue is fractionated to give about 100.5 g. of pale yellow liquid, B.P. about 109–113° (0.1 mm.).

(B) *Preparation of 4-chloro-2'-(3-dimethylaminopropylthio)cinnamanilide, hydrochloride.*—A solution of 11.1 g. of p-chlorocinnamoyl chloride in 150 ml. of chloroform is cooled to 15° and treated dropwise with a solution of 11.6 g. of material from part (A) in 50 ml. chloroform. The mixture is stirred at room temperature for thirty minutes, refluxed for one hour, cooled and diluted with 300 ml. of ether to give about 22 g. of product, M.P. about 140–145°. This material is dissolved in 200 ml. of hot acetonitrile, filtered from the small amount of insoluble material, and the filtrate allowed to cool yielding about 16.1 g. of colorless product, M.P. about 148–150°.

(C) By treating the product of part (B) above with hydrogen peroxide according to the procedure of Example 17(B), there is obtained 4-chloro-2'-(3-dimethylaminopropylsulfonyl)cinnamanilide, hydrochloride.

EXAMPLE 19

*2'-(3-dimethylaminopropylsulfonyl)acetanilide, hydrochloride*

(A) *Preparation of 2'-(3-dimethylaminopropylthio)-acetanilide, hydrochloride.*—A solution of 7.9 g. of acetyl chloride in 200 ml. of benzene is cooled to 15° and treated dropwise with a solution of 21.0 g. of material from Example 18, part (A) in 100 ml. of benzene. The mixture is stirred at room temperature for thirty minutes, refluxed for one hour, cooled and the colorless product filtered to give 2' - (3 - dimethylaminopropylthio)acetanilide, hydrochloride.

(B) By oxidizing the product from part (A) above with hydrogen peroxide as in Example 17(B), there is obtained 2'-(3-dimethylaminopropylsulfonyl)acetanilide, hydrochloride.

EXAMPLE 20

*N-ethyl-2'-(3-dimethylaminopropylsulfonyl)cinnamanilide, hydrochloride*

(A) *Preparation of N-ethyl-2'-(3-dimethylaminopropylthio)aniline.*—A solution of 27.0 g. of material from Example 19A in 200 ml. of water is cooled and treated with a solution of 14 g. of potassium carbonate in 50 ml. of water. The liberated base is extracted with 100 ml. portions of ether (three times) and the combined extract dried over magnesium sulfate. The mixture is filtered and the filtrate added dropwise to a slurry of 4 g. of lithium aluminum hydride in 200 ml. of dry ether. After stirring the mixture for eight hours, the mixture is cooled and treated dropwise with 5 ml. of water, followed by a solution of 2 g. of sodium hydroxide in 10 ml. of water. The mixture is filtered, the filtrate dried over magnesium sulfate, filtered and evaporated the solvent to give N-ethyl - 2' - (3 - dimethylaminopropylthio)-aniline.

(B) *Preparation of N-ethyl-2'-(3-dimethylaminopropylthio)cinnamanilide, hydrochloride.*—A solution of 8.4 g. of cinnamoyl chloride in 100 ml. of benzene is cooled to 15° and treated dropwise with a solution of 11.9 g. of material from step A in 50 ml. of benzene. The mixture is refluxed for one hour, cooled and filtered. N-ethyl-(3-dimethylaminopropylthio)cinnamanilide hydrochloride is formed.

(C) *Preparation of N-ethyl-2'-(3-dimethylaminopropylsulfonyl) cinnamanilide, hydrochloride.*—By treating the product of part (B) above with hydrogen peroxide as in Example 17(B), N-ethyl-2'-(3-dimethylaminopropylsulfonyl)cinnamanilide, hydrochloride, is obtained.

EXAMPLE 21

*N-benzyl-2'-(3-dimethylaminopropylsulfonyl) cinnamanilide, hydrochloride*

Substitution of 14.0 g. of benzoyl chloride for the acetyl chloride in Example 19A gives 2'-(3-dimethylaminopropylthio)benzanilide, hydrochloride. Treatment of this material in the same manner as in Example 20, step A, gives N-benzyl-2'-(3-dimethylaminopropylthio)aniline. The reaction of this material with one equivalent of cinnamoyl chloride in the same manner as in Example 4, step B, gives N-benzyl-2'-(3-dimethylaminopropylthio)-cinnamanilide, hydrochloride. Then treatment with hydrogen peroxide as in Example 17(B) gives N-benzyl-2'-(3 - dimethylaminopropylsulfonyl)cinnamanilide, hydrochloride.

EXAMPLE 22

*2'-(3-diethylaminopropylsulfonyl)cinnamanilide, hydrochloride*

(A) *Preparation of 2'-(3-diethylaminopropylthio)aniline.*—Substitution of 164 g. of 3-diethylaminopropyl chloride for the 3-dimethylaminopropyl chloride in Example 17, part (A) gives 2'-(3-diethylaminopropylthio)aniline, B.P. about 115–117° (0.2 mm.).

(B) *Preparation of 2'-(3-diethylaminopropylthio)cinnamanilide, hydrochloride.*—Interaction of 33.4 g. of material from part (A) with 23.4 g. of cinnamoyl chloride in chloroform as in Example 17, part (B), gives 54 g. of product, M.P. about 178–180°. After crystallization from acetonitrile, the product weighs about 46 g., M.P. about 179–181°.

(C) *Preparation of 2'-(3-diethylaminopropylsulfonyl) cinnamanilide, hydrochloride.*—Treatment of the product of part (B) above with hydrogen peroxide as in Example 17(B) gives 2'-(3-diethylaminopropylsulfonyl)cinnamanilide, hydrochloride.

EXAMPLE 23

*2'-(3-diethylaminopropylsulfonyl)sorbanilide hydrochloride*

Following the procedure of Example 22, but substituting an equivalent amount of sorboyl chloride for the cinnamoyl chloride in part (B), 2'-(3-diethylaminopropylthio)sorbanilide, hydrochloride is obtained. Then treatment of the latter with hydrogen peroxide as in Example 17(B) gives the desired product.

EXAMPLE 24

*2' - (3 - diethylaminopropylsulfonyl)phenylpropiolyl-anilide, hydrochloride*

Following the procedure of Example 22, but substituting an equivalent amount of phenylpropiolyl chloride for the cinnamoyl chloride in part (B), 2'-(3-diethylaminopropylthio)propiolylanilide, hydrochloride, is obtained.

EXAMPLE 25

*2'-(3-dimethylaminopropylsulfonyl)cinnamanilide, hydrochloride*

A solution of 17.6 g. of material from Example 17(A) in 25 ml. of ethanol-50 ml. of ether is treated with 8.6 ml. of 6.0 N alcoholic hydrogen chloride. The resulting solution is diluted to 700 ml. with ether to yield a gummy product. The mother liquor is decanted from the product and the latter dissolved in 50 ml. of warm acetonitrile. The solution is diluted with 50 ml. of ether to give about 19.0 g. of colorless solid, M.P. about 111–112°. After crystallization from 60 ml. of isopropyl alcohol, the 2'-(3-dimethylaminopropylthio)cinnamanilide, hydrochloride, melts at about 145–147°. Treatment of the latter with hydrogen peroxide in Example 17(B) yields 2'-(3-dimethylaminopropylsulfonyl)cinnamanilide, hydrochloride.

EXAMPLE 26

*2'-(3-dimethylaminopropylsulfonyl)cinnamanilide, methochloride*

A mixture of 46 g. of the oxalate from Example 17(B) and 200 ml. of water is treated with a solution of 8 g. of sodium hydroxide in 50 ml. of water. The free base is extracted with 200 ml. of ether (three times) and the combined ether phase dried over magnesium sulfate, filtered and the solvent evaporated. The residue is dissolved in 200 ml. of acetonitrile and treated with 30 g. of methyl chloride. After standing at room temperature for two days, the mixture is diluted with 500 ml. of ether and the colorless product is filtered and dried.

EXAMPLE 27

*2'-[3-(1-methyl-4-piperazinyl)propylsulfonyl]cinnamanilide, dihydrochloride*

(A) By substitution of 33 g. of 1-(3-chloropropyl)-4-methylpiperazine for the 3-dimethylaminopropyl chloride in Example 17, there is obtained 2'-[3-(1-methyl-4-piperazinyl)propylthio]cinnamanilide base as an oil. The latter is dissolved in absolute alcohol and treated with excess alcoholic hydrogen chloride. Dilution of the solution with ether gives a gummy solid which solidified on trituration with hot butanone. Purification is carried out by recrystallization from ethanol and dimethylformamide, M.P. 218–220°.

(B) Treatment of the product of part (A) with hydrogen peroxide as in Example 17(B) yields 2'-[3-(1-methyl-4-piperazinyl)propylsulfonyl]cinnamanilide, dihydrochloride.

Similarly by substituting 1-(3-chloropropyl)-4-(2-hydroxyethyl)piperazine, 1-(3-chloropropyl)-4-(2-acetoxyethyl)piperazine, 1-(2-chloroethyl)-4-[2-(2'-hydroxyethoxy)ethyl]piperazine, 1-(3-chloropropyl)piperidine, 1-(2-chloropropyl)pyrrolidine, 4-(3-chlorobutyl)morpholine, and 1-methyl-3-(3-chloropropyl)piperidine for the 1-(3-chloropropyl)-4-methyl-piperazine in the procedure of Example 17(A), then reacting the product with hydrogen peroxide as in Example 17(B), the hydrochloride salts of the following compounds are obtained respectively:

2'-[3-(1-(2-hydroxyethyl)-4-piperazinyl)propylsulfonyl]cinnamanilide;
2'-[3-(1-(2-acetoxyethyl)-4-piperazinyl)propylsulfonyl]cinnamanilide;
2'-[2-(4-[2''-hydroxyethoxy)ethyl]-4-piperazinyl)ethylsulfonyl]cinnamanilide;
2'-(3-piperidinopropylsulfonyl)cinnamanilide;
2'-(2-pyrrolidinopropylsulfonyl)cinnamanilide;
2'-(3-morpholinobutylsulfonyl)cinnamanilide and
2'-[3-(1-methyl-3-piperidyl)-propylsulfonyl]cinnamanilide.

EXAMPLE 28

*4'-(2-dimethylaminobutylsulfonyl)cinnamanilide*

(A) *Preparation of 2'-(4-chlorobutylthio)cinnamanilide.*—A suspension of 9.6 g. of sodium hydride dispersion (50%) in 500 ml. of toluene is treated with a suspension of 50.8 g. of 3,4-dihydro-2-phenyl-1,5-benzothiazepin-4-one in 500 ml. of toluene. After stirring for five minutes at room temperature the resulting solution is treated with 172 g. of tetramethylenechlorobromide and the mixture refluxed for three hours. The mixture is cooled, treated with 150 ml. of water and the organic phase concentrated under reduced pressure to give 2'-(4-chlorobutylthio)cinnamanilide.

(B) *Preparation of 2'-(4-dimethylaminobutylthio)cinnamanilide.*—A mixture of 20 g. of material from A, 5 g. of sodium iodide and 100 g. of dimethylamine in 700 ml. of benzene is allowed to stand for a day, then refluxed for four hours, cooled and washed with 100 ml. of water. The organic phase was concentrated under reduced pressure to give 2'-(4-dimethylaminobutylthio)cinnamanilide.

(C) *Preparation of 2'-(4-dimethylaminobutylsulfonyl)cinnamanilide.*—By treating the material from B with hydrogen peroxide according to the procedure of Example 17(B) there is obtained 2'-(4-dimethylaminobutylsulfonyl)cinnamanilide.

What is claimed is:

1. A compound of the group consisting of bases of the formula

wherein R is a member of the group consisting of hydrogen, lower alkyl, $(X)_m$-phenyl, furyl, thienyl, pyridyl and piperonyl, $R^1$ is a member of the group consisting of hydrogen, lower alkyl and phenyl-lower alkyl, Y is a member of the group consisting of lower alkenylene and lower alkynylene, Z is a member of the group consisting of carbonyl and sulfonyl, B is a basic, nitrogen containing radical of the group consisting of

and

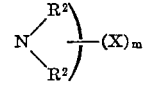

wherein each $R^2$ is a member of the group consisting of hydrogen, lower alkyl, hydroxy-lower alkyl, phenyl-lower alkyl and N-(lower alkyl)phenyl-lower alkyl and together are a member of the group consisting of tetramethylene, pentamethylene, hexamethylene, oxytetramethylene, oxypentamethylene, azatetramethylene, azapentamethylene, azahexamethylene, thiatetramethylene and thiapentamethylene, X is a member of the group consisting of hydrogen, halo, lower alkyl, lower alkoxy, hydroxy, hydroxy-lower alkyl, lower alkanoyl, trihalomethyl, nitro, amino and di(lower alkyl)amino, $m$ represents an integer from 1 to 3, and $n$ represents an integer from 1 to 2, and acid addition salts and quaternary ammonium salts of said bases.

2. A compound of the formula

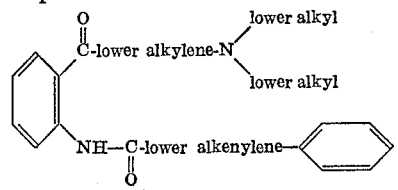

3. A physiologically acceptable acid addition salt of a compound of claim 2.

4. A compound of the formula

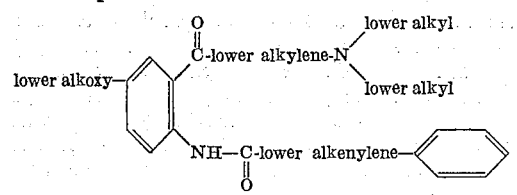

5. A compound of the formula

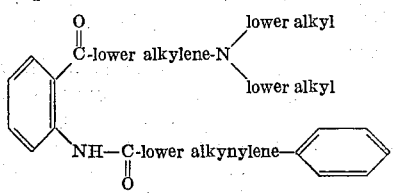

6. A compound of the formula

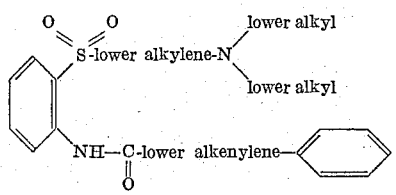

7. 2'-(3-dimethylaminopropylsulfonyl)cinnamanilide.
8. 2'-(3-dimethylaminopropionyl)cinnamanilide.
9. 2'-(3-dimethylaminopropionyl)-4 - methoxycinnamanailide.
10. 2'-[3 - (4 - methylpiperazino)propionyl]cinnamanilide.

No references cited.